W. L. KELLEY.
LOCKING RING.
APPLICATION FILED JULY 14, 1911.

1,077,282.

Patented Nov. 4, 1913.

WITNESSES.
Albert G. Puegenthowski
George H. McLaughlin

INVENTOR.
Walter L. Kelley
By Horatio E. Bellows
ATTORNEY.

UNITED STATES PATENT OFFICE.

WALTER L. KELLEY, OF PAWTUCKET, RHODE ISLAND.

LOCKING-RING.

1,077,282.   Specification of Letters Patent.   Patented Nov. 4, 1913.

Application filed July 14, 1911. Serial No. 638,488.

*To all whom it may concern:*

Be it known that I, WALTER L. KELLEY, a citizen of the United States, residing at Pawtucket, in the county of Providence and State of Rhode Island, have invented certain new and useful Improvements in Locking-Rings, of which the following is a specification.

My invention relates to locking rings for tires and has for its essential objects security in position and facility for application and removal.

To the above ends essentially my invention consists in the novel construction, arrangement, and combination of parts hereinafter described, and illustrated in the accompanying drawings, wherein—

Figure 1:
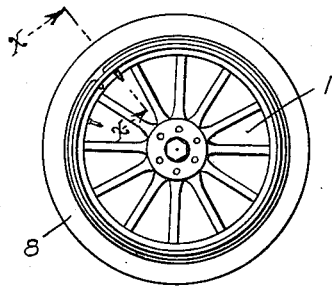
Figure 2:
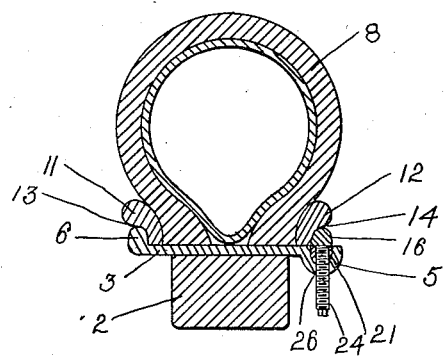
Figure 3:
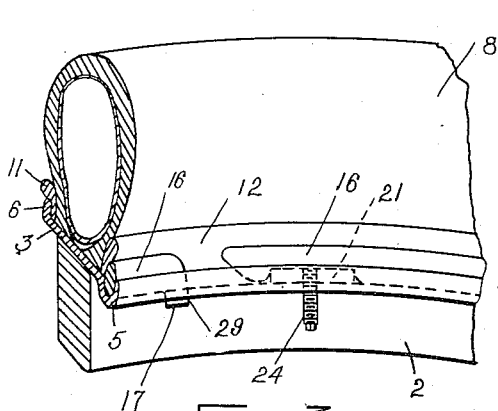
Figure 4:
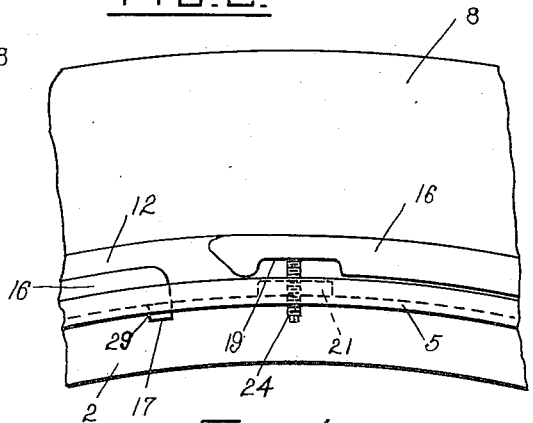
Figure 5:
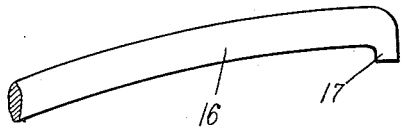
Figures 6, 7:
Figure 8:
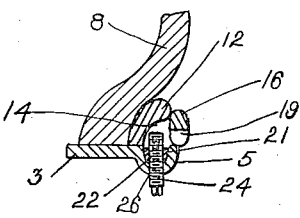

Figure 1 represents in side elevation a wheel equipped with my novel device, Fig. 2, a section on line $x$ $x$ of Fig. 1, Fig. 3, a side elevation, partially in transverse section, of a portion of the tire and adjacent parts, Fig. 4, a side elevation of the same showing the locking ring elevated, Fig. 5, a side elevation of the adjacent ends of the locking ring, Figs. 6 and 7, side and end elevations respectively of the plate and attached elevating screw, and Fig. 8, a partial section on line $x$ $x$ of Fig. 1 showing the locking ring at the instant of disengagement.

In the accompanying drawings like reference characters indicate like parts throughout the views.

My invention is shown in connection with a wheel 1 having the usual felly 2 upon which is a rim body 3 constituting the tire seat and provided with a laterally extending annular concaved flange 5 upon one margin constituting a ring seat, and provided upon its other margin preferably with an annular raised flange or bead 6. Any preferred usual form of wearing shoe or cover 8 is adapted to rest upon the tire seat 3 and may be retained thereon by any desired means. In the present instance the retaining means consists of two bearing rings 11 and 12 of similar construction seated upon the rim 3 upon either side of the tire cover; and provided respectively with outwardly inclined outer faces 13 and 14 near their outer portions. The ring 11 abuts against the bead 6 at one side of the tire cover, and the ring 12 bears against the opposite side of the cover in the usual manner.

A split locking ring 16 is sprung into the depressed groove 5 of the main rim 3, and is purposed to lock the tire cover and adjacent parts in position. In detail the ring 16 is provided at one end with an inturned lug 17. Near the extremity of the adjacent end is an oblong recess 19, in which registers a plate 21 resting in the bottom of the grooved flange 5, or integral with said flange. The plate is provided with a central threaded opening 22 to loosely receive a screw 24 which also traverses an opening 26 in the flanged seat 5, and is provided preferably with a squared inner end 27 adapted to fit in a key or wrench. The lug 17 registers in an opening 29 in the member 5. The ring 16 is preferably curved in cross section, and the inner face 30 of the plate 21 is curved to conform more nearly to its seat.

The normal position of the locking parts is shown in Fig. 3. When it is desired to remove the locking ring the screw 24 is turned whereby its outer end elevates the recessed end of the locking ring 16 to a point above the member 5 where it is accessible for removal. When the bearing ring 12 is provided with an inclined face 14, the latter in conjunction with the elevating screw serves to force the ring 16 outwardly and laterally to the position indicated in Fig. 8.

What I claim is:—

1. The combination with a wheel rim, of a flange upon the rim provided with a longitudinal groove, a split locking ring seated in the groove and provided near one end with a recess, a plate resting upon the flange in the groove, and registering in the recess, and a screw loosely mounted in the plate and flange and abutting against the ring to elevate the recessed end of the locking ring above the flange of the rim.

2. The combination with a wheel rim, of a flange upon the rim provided with a groove and with two openings, a split locking ring seated in the groove, a lug upon one end of the locking ring extending into one opening, a screw loosely mounted in the second opening and abutting against the other end of the locking ring to elevate the recessed end thereof in position for its easy removal and a plate located between the flange and the last mentioned end and provided with a threaded opening to receive said screw.

3. The combination with a wheel rim having a grooved flange, of a plate seated in said flange, a bearing ring bearing on said flange, a locking ring with its ends disconnected and having one end engaged in said flange and the other provided with a longitudinally disposed recess upon its under face to receive said plate, and a forcing device independent of said locking ring and movably mounted in said plate and engageable with the adjacent end of said ring to elevate the latter in position for easy removal.

4. The combination with a wheel rim having a grooved flange, of a plate seated in said flange, a bearing ring bearing on said flange, a locking ring with its ends disconnected and having one end engaged in said flange and the other provided with a longitudinally disposed recess upon its under face to receive said plate, and a forcing device independent of said locking ring and movably mounted in said plate and engageable with the adjacent end of said ring to elevate the latter in position for easy removal, the outer face of said bearing ring being outwardly inclined for outwardly guiding the end of the locking ring as the latter is forced outward.

In testimony whereof I have affixed my signature in presence of two witnesses.

WALTER L. KELLEY.

Witnesses:
HORATIO E. BELLOWS,
GEORGE H. McLAUGHLIN.